(12) United States Patent
Vaquer Tarrago et al.

(10) Patent No.: US 10,914,561 B2
(45) Date of Patent: Feb. 9, 2021

(54) ARCHERY PROJECTILE LOCATION FACILITY

(71) Applicant: Archery Intelligence, LLC, Stamford, CT (US)

(72) Inventors: Jordi Vaquer Tarrago, Tarragona (ES); Josep Lluis Vaquer Tarrago, Tarragona (ES); Joan de Magrina Calaf, Tarragona (ES)

(73) Assignee: ARCHERY INTELLIGENCE, LLC, Stamford, CT (US)

( * ) Notice: Subject to any disclaimer, the term of this patent is extended or adjusted under 35 U.S.C. 154(b) by 0 days.

(21) Appl. No.: 16/198,508

(22) Filed: Nov. 21, 2018

(65) Prior Publication Data

US 2019/0226821 A1     Jul. 25, 2019

Related U.S. Application Data

(60) Provisional application No. 62/621,089, filed on Jan. 24, 2018.

(51) Int. Cl.
*F42B 12/38* (2006.01)
*F42B 6/08* (2006.01)

(52) U.S. Cl.
CPC .............. *F42B 12/385* (2013.01); *F42B 6/08* (2013.01)

(58) Field of Classification Search
CPC ........ F42B 12/365; F42B 12/385; F42B 6/04; F42B 6/06
USPC ................................... 473/570, 578; 455/98
See application file for complete search history.

(56) References Cited

U.S. PATENT DOCUMENTS

| 4,421,319 A | * | 12/1983 | Murphy | F42B 12/362 473/353 |
| 4,675,683 A | * | 6/1987 | Robinson | F42B 6/04 342/386 |
| 4,704,612 A | * | 11/1987 | Boy | G01S 1/68 342/386 |
| 4,885,800 A | * | 12/1989 | Ragle | F42B 12/385 455/98 |
| 4,976,442 A | * | 12/1990 | Treadway | F42B 12/385 473/570 |
| 5,024,447 A | * | 6/1991 | Jude | F42B 12/385 342/386 |
| 5,157,405 A | * | 10/1992 | Wycoff | F42B 12/385 342/386 |

(Continued)

OTHER PUBLICATIONS

Breadcrumb Bluetooth Trackable Nock; https://breadcrumbtech.com/bluetooth-nock/ Jul. 29, 2019.

(Continued)

*Primary Examiner* — Alexander R Niconovich
(74) *Attorney, Agent, or Firm* — Bennet K. Langlotz; Langlotz Patent & Trademark Works, LLC

(57) ABSTRACT

An archery projectile locating facility comprises an elongated body. The elongated body includes a connection facility adapted to connect to the archery projectile. The elongated body includes a microcontroller. The elongated body includes a sensor facility in communication with the microcontroller and operable to detect a flight state. The elongated body includes a transmitter in communication with the microcontroller and operable to broadcast at least one data signal after the flight state has been detected. The at least one data signal includes information generated by the sensor facility.

30 Claims, 12 Drawing Sheets

(56) References Cited

U.S. PATENT DOCUMENTS

| | | | | |
|---|---|---|---|---|
| 5,167,417 | A * | 12/1992 | Stacey | F42B 6/04 473/570 |
| 5,188,373 | A * | 2/1993 | Ferguson | F42B 12/385 473/578 |
| 5,450,614 | A * | 9/1995 | Rodriguez | F42B 6/02 455/128 |
| 6,612,947 | B2 * | 9/2003 | Porter | F42B 12/385 473/578 |
| 6,764,420 | B2 * | 7/2004 | Cyr | F42B 6/06 455/98 |
| 6,814,678 | B2 * | 11/2004 | Cyr | F42B 12/385 455/98 |
| 6,856,250 | B2 * | 2/2005 | Hilliard | G01S 13/758 102/502 |
| 7,300,367 | B1 * | 11/2007 | Andol | F42B 6/04 342/385 |
| 7,632,199 | B2 * | 12/2009 | Kikos | F42B 12/385 473/578 |
| 7,909,714 | B2 * | 3/2011 | Cyr | F42B 6/06 473/578 |
| 8,075,430 | B1 * | 12/2011 | Hester | F42B 12/385 473/578 |
| 8,216,097 | B2 * | 7/2012 | Nick | F42B 6/06 473/586 |
| 8,323,132 | B2 * | 12/2012 | Kirsch | F42B 12/385 473/578 |
| 8,393,982 | B2 * | 3/2013 | Ferguson | F41B 5/1438 473/578 |
| 8,425,354 | B2 * | 4/2013 | Ferguson | F42B 12/385 473/578 |
| 8,696,498 | B1 * | 4/2014 | Andrus | F42B 6/04 473/578 |
| 8,821,325 | B2 * | 9/2014 | Kirsch | F42B 12/385 473/578 |
| 8,952,808 | B2 * | 2/2015 | Steinman | F42B 12/365 340/539.13 |
| 9,005,057 | B2 * | 4/2015 | Donahoe | F42B 6/08 473/582 |
| 9,075,124 | B2 * | 7/2015 | Zusman | G01S 3/40 |
| 9,307,300 | B2 * | 4/2016 | DiSanto | F42B 6/02 |
| 9,423,504 | B1 * | 8/2016 | Gossett | F42B 12/385 |
| 9,513,093 | B1 * | 12/2016 | Steinman | F42B 12/385 |
| 9,557,148 | B2 * | 1/2017 | Ledbetter | F42B 12/365 |
| 10,401,136 | B1 * | 9/2019 | VanTassell | G01S 5/0226 |
| 10,443,991 | B2 * | 10/2019 | Emrich | G08B 7/00 |
| 2008/0176681 | A1 * | 7/2008 | Donahoe | F41B 5/148 473/570 |
| 2011/0306447 | A1 * | 12/2011 | McFatridge | F42B 12/385 473/578 |
| 2012/0196708 | A1 * | 8/2012 | Maddox | F42B 12/365 473/570 |
| 2014/0100066 | A1 * | 4/2014 | Roman | F42B 6/02 473/582 |
| 2015/0237239 | A1 * | 8/2015 | Lyren | F42B 12/365 348/375 |
| 2016/0169929 | A1 * | 6/2016 | Donahoe | G01D 21/02 702/149 |

OTHER PUBLICATIONS

Game Vector—Game Recovery System, Iron Mountain Products LLC, Lecompton, KS, 866-535-8009; http://www.archerywire.com/releases/297146/—Jul. 29, 2019.

Pro-Tracker Transmitter, developed by Pro-Tracker LLC, Rexburg, ID, 208-356-0657; https://pro-tracker.com Jul. 29, 2019.

* cited by examiner

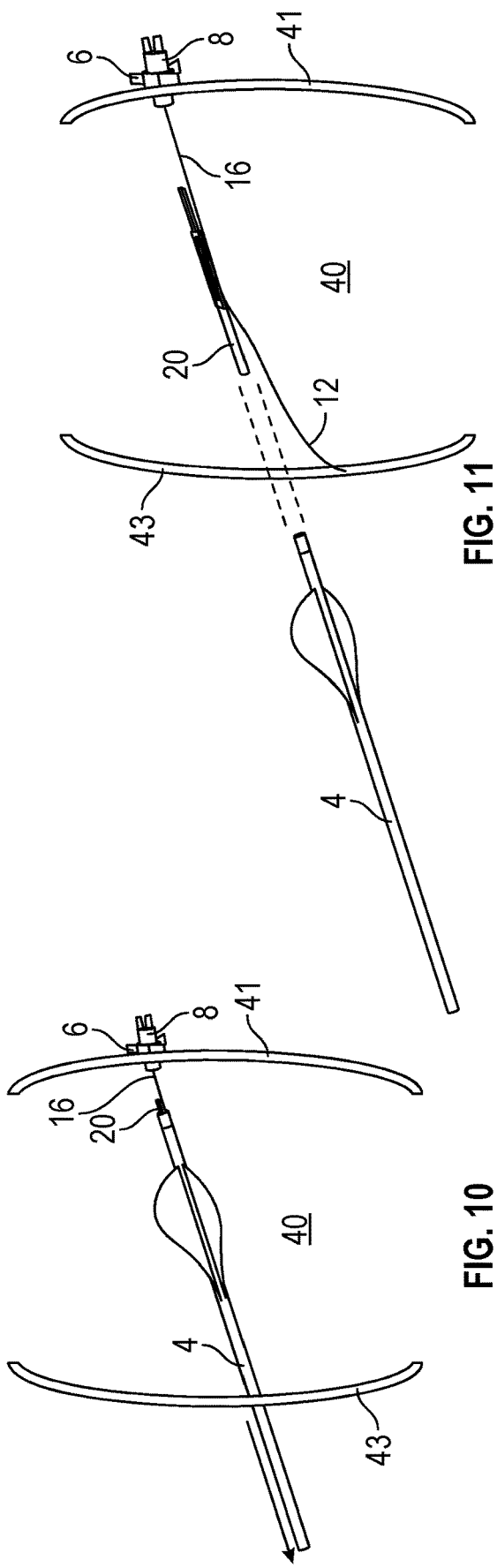
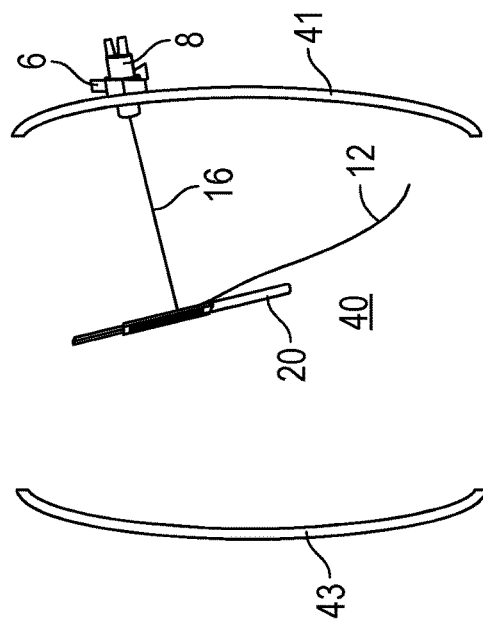

ARCHERY PROJECTILE LOCATION FACILITY

CROSS-REFERENCE TO RELATED APPLICATION

This application claims the benefit of U.S. Provisional Application No. 62/621,089, filed 24 Jan. 2018, which is hereby incorporated by reference in its entirety.

FIELD OF THE PRESENT DISCLOSURE

The present disclosure generally relates to archery projectiles. More particularly, the present disclosure relates to locating archery projectiles after a flight has been initiated.

BACKGROUND OF THE PRESENT DISCLOSURE

Many archery projectiles are lost after flight and are not recovered. For example, archery projectiles that miss an intended target may be lost in forests, shrubs, and/or grass.

Many game animals are targeted by hunters using archery projectiles. Many of these game animals are injured after being impacted by an archery projectile. However, some of the injured game animals may not be recovered by the hunters. Many existing archery projectile tracking systems may not be adaptable to assist in the tracking of an injured animal when the projectile completely passes through the animal or is damaged from animal movement.

Many existing disclosures on archery projectile tracking systems are based on the intended use of the Global Positioning System (GPS) for location. However, many GPS receivers are too large to be inserted into a hollow arrow shaft. In addition, a transmitter co-located with a GPS receiver may not be able to establish a connection with a remote receiver to transfer GPS based location information when signal transmissions are blocked by terrain and/or dense vegetation. Many existing archery projectile tracking systems are configured to emit radio signals. However, radio signals emitted at a single power level may limit the effective range of a directional receiver. For example, an emitter transmitting a high-powered signal may overload the front end of the directional receiver preventing the determination of a direction of the emitter when the distance to the emitter is a short distance. For example, an emitter transmitting a low-powered signal may not be detected by the front end of the direction receiver preventing the determination of a direction of the emitter when the distance to the emitter is a long distance. Many existing archery projectile tracking systems are configured to emit analog signals. Transmission of multiple analog signals in a single hunting zone may cause confusion to the users of one or more receivers.

Many existing archery projectile tracking systems may not be adapted easily to a plurality of third-party arrow shafts and/or a plurality of third-party broadheads. Employment of many existing archery projectile tracking systems may negatively impact the trajectory and/or the kinetic energy of archery projectiles during flight, especially over ranges required in many hunting situations. Employment of many existing archery projectile tracking systems may negatively impact the penetration depth into a target game animal.

What is needed is an improved archery projectile location facility.

SUMMARY OF THE PRESENT DISCLOSURE

At least some embodiments of the present disclosure provide an archery projectile locating facility. The archery projectile locating facility comprises an elongated body. The elongated body includes a connection facility adapted to connect to the archery projectile. The elongated body includes a microcontroller. The elongated body includes a sensor facility in communication with the microcontroller and operable to detect a flight state. The elongated body includes a transmitter in communication with the microcontroller and operable to broadcast at least one data signal after the flight state has been detected. The at least one data signal includes information generated by the sensor facility.

The archery projectile locating facility may include a directional receiver. The directional receiver may be adapted to receive the at least one data signal, such that the elongated body may be located by a user with the directional receiver.

The elongated body may be removably received in a rear aperture of a hollow arrow shaft.

The archery projectile locating facility may include a stop element connected to the elongated body and having a radial protrusion.

The stop element may include a cylindrical body adapted to be staked to a rear end of a hollow arrow shaft. The stop element may define a bore adapted to receive a portion of a nock removably connected to the hollow arrow shaft.

The hollow arrow shaft may have a shaft radius. The radial protrusion may extend to a greater radius than the shaft radius, such that the radial protrusion is adapted to contact target animal tissue to prevent the elongated body from penetrating beyond a target animal even as the hollow arrow shaft may penetrate beyond.

The hollow arrow shaft may have fletching. The stop element may have a plurality of radial protrusions adapted to substantially align with the fletching when staked to a rear end of the hollow arrow shaft.

The radial protrusion may be a planar fin element having a plane parallel to an axis defined by the elongated body.

The stop element may be connected to the elongated body by a tether.

The archery projectile locating facility may include a nock connected to the elongated body by a tether.

The archery projectile locating facility may include an antenna in electrical communication with the transmitter.

The antenna may be an elongated wire connected at one end to the elongated body.

The antenna may have a free end free of the elongated body.

The sensor facility may include a temperature sensor adapted to generate temperature information on the elongated body.

The transmitter may be adapted to transmit the temperature information as part of the at least one data signal.

The archery projectile locating facility may include an energy storage device in electrical communication with the microcontroller and the sensor facility. The sensor facility may be operable to generate energy status information.

The transmitter may be adapted to transmit the energy status information as part of the at least one data signal.

The sensor facility may include an acceleration sensor adapted to generate movement information.

The transmitter may be adapted to transmit the movement information as part of the at least one data signal.

The elongated body may be slidably received in the hollow arrow shaft such that the elongated body is removable from the hollow arrow shaft with limited force.

The stop element may be connected to the hollow arrow shaft by way of a slip fit.

The elongated body may include a signal designator.

The at least one data signal may be encrypted based on the signal designator.

The directional receiver may be further adapted to decrypt the at least one data signal through employment of the signal designator.

The directional receiver may be further adapted to communicate at least one of the following to a remote computing device: location information, direction information, temperature information, energy status information, and movement information.

Each of the at least one data signal may be encoded based on a transmit power level.

The directional receiver is further adapted to decode the at least one data signal.

A first of the at least one data signal may be transmitted at a first power level and a second of the at least one data signal may be transmitted at a second power level. The first power level may be distinct from the second power level.

The first of the at least one data signal may be encoded with a first signal code. The second of the at least one data signal may be encoded with a second signal code. The first signal code may be distinct from the second signal code.

BRIEF DESCRIPTION OF THE DRAWINGS

FIG. 10 illustrates an example archery projectile with an example archery projectile locating facility travelling through a cavity of a target animal according to an aspect of an embodiment.

FIG. 11 illustrates an example archery projectile penetrating beyond a cavity of a target animal, and an example archery projectile locating facility separated from the archery projectile according to an aspect of an embodiment.

FIG. 12 illustrates an example archery projectile locating facility embedded in a cavity of a target animal according to an aspect of an embodiment.

DETAILED DESCRIPTION

Embodiments of the present disclosure now will be described more fully hereinafter with reference to the accompanying drawings, in which embodiments of the present disclosure are shown. This present disclosure may, however, be embodied in many different forms and should not be construed as limited to the embodiments set forth herein; rather, these embodiments are provided so that this disclosure will be thorough and complete, and will fully convey the scope of the present disclosure.

Certain embodiments of the present disclosure provide an archery projectile locating facility. For the purposes of this disclosure, archery projectiles may include but are not limited to arrows and bolts.

At least some embodiments of the present disclosure provide specific information related to an injured animal to increase the efficiency of hunters tracking the injured animal. Employment of the specific information may increase the likelihood of successfully finding the injured animal. Examples of this specific information include but are not limited to: location of the animal, whether or not the animal is moving, temperature of the animal, combinations thereof, and/or the like. Data on the location of the animal or direction to the location of the animal may be employed by the hunters to determine a direction to search. Accurate data on animal movement may be employed by the hunters to determine when to begin a search. Accurate data on animal temperature may be employed by the hunters to determine when to begin a search and/or whether an animal is safe to approach.

Figure 1:
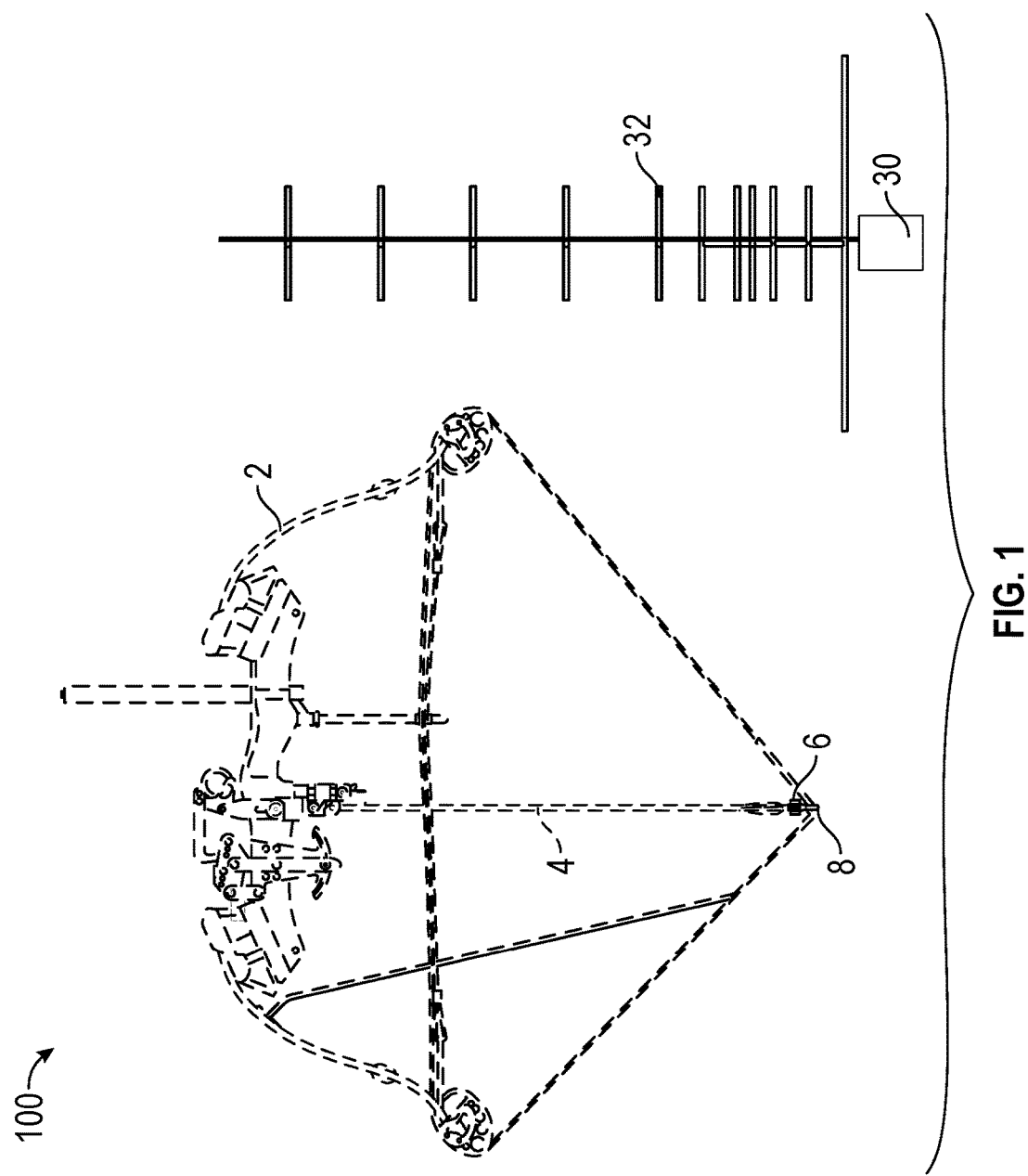
FIG. 1 illustrates an example archery projectile locating facility with an optional compound bow and an optional archery projectile according to various aspects of an embodiment.

FIG. 1 illustrates an example archery projectile locating facility 100 with an optional compound bow 2 and an optional archery projectile according to various aspects of an embodiment. The archery projectile locating facility 100 may comprise a stop element 6 and a nock 8. The archery projectile may comprise a hollow arrow shaft 4, and a tip or broadhead. The archery projectile locating facility 100 may comprise a directional receiver 30. The directional receiver 30 may be in electrical communication with a directional antenna 32. The directional receiver 30 may be in wireless communication with the directional antenna 32. The compound bow 2 may be configured to shoot archery projectiles such as the one illustrated for example purposes.

Figure 2:
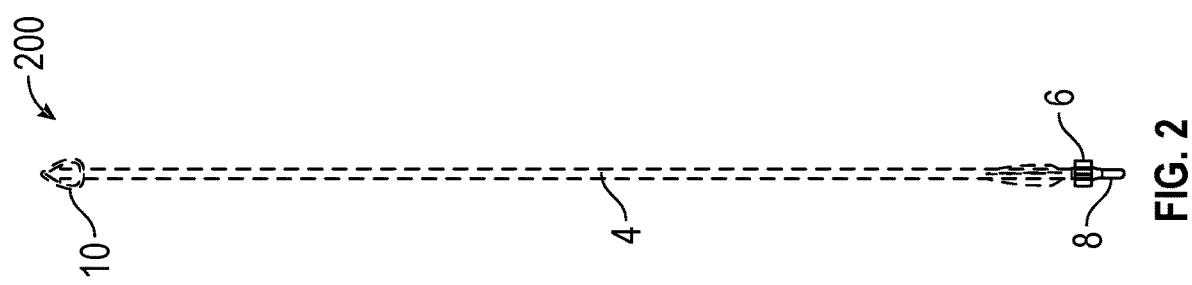
FIG. 2 illustrates an example archery projectile with an example archery projectile locating facility installed according to various aspects of an embodiment.

FIG. 2 illustrates an example archery projectile 200 with an example archery projectile locating facility installed according to various aspects of an embodiment. The archery projectile 200 may comprise a hollow shaft 4 and a broadhead 10. The archery projectile locating facility may comprise a stop element 6 and a nock 8.

Figure 3:
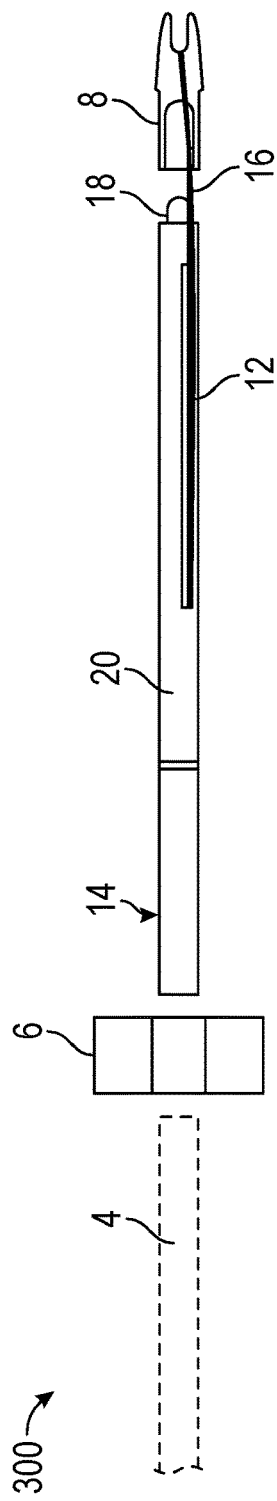
FIG. 3 illustrates an example archery projectile locating facility with an optional example hollow arrow shaft according to an aspect of an embodiment.

FIG. 3 illustrates an example archery projectile locating facility 300 with an optional example hollow arrow shaft 4 according to an aspect of an embodiment. The archery projectile locating facility 300 may comprise an elongated body 20. The elongated body 20 may be removably received in a rear aperture of the hollow arrow shaft 4. The archery projectile locating facility 300 may include a stop element 6. The stop element 6 may have a radial protrusion. The stop element 6 may be connected to the hollow arrow shaft 4 by way of a slip fit. The archery projectile locating facility 300 may include a nock 8 connected to the elongated body 20 by a tether 16. The archery projectile locating facility 300 may include an energy storage device 14 connected to the elongated body 20. The energy storage device 14 and/or the elongated body 20 may be coated in water resistant material (e.g. resin). The archery projectile locating facility 300 may include an antenna 12. The antenna 12 may comprise an elongated wire connected at one end to the elongated body 20. The elongated body 20 may comprise an Light Emitting Diode (LED) 18. The LED may be activated upon detection of a flight state and/or a detection of impact.

According to an embodiment, a width of an elongated body (e.g. 20) may be less than 4.5 mm. The length of the elongated body (e.g. 20) may be less than 120 mm. The weight of the elongated body (e.g. 20) may be less than 40 grains.

Figure 4:
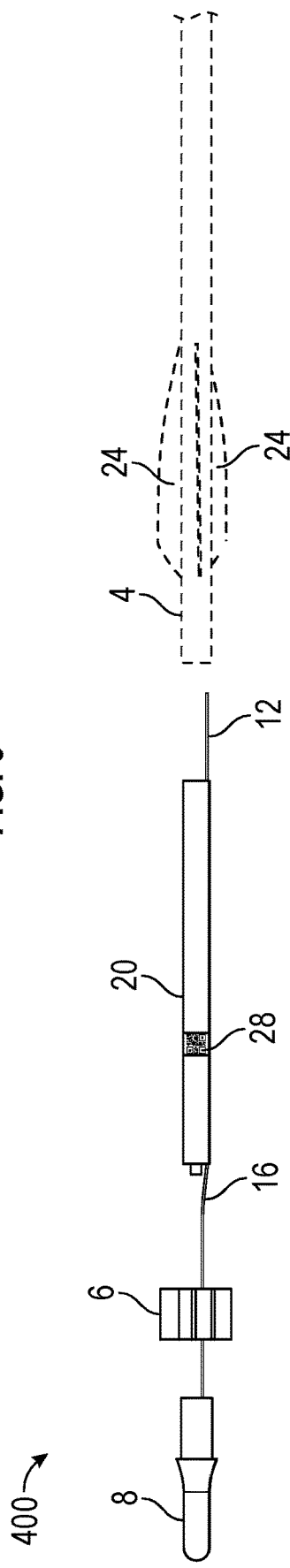
FIG. 4 illustrates an example archery projectile locating facility with an optional example hollow arrow shaft according to an aspect of an embodiment.

FIG. 4 illustrates an example archery projectile locating facility 400 with an optional example hollow arrow shaft 4 according to an aspect of an embodiment. The archery projectile locating facility 400 may comprise an elongated body 20. The elongated body 20 may be removably received in a rear aperture of the hollow arrow shaft 4. The hollow arrow shaft 4 may comprise fletching 24. The archery projectile locating facility 400 may include a stop element 6. The stop element 6 may have a radial protrusion. The archery projectile locating facility 400 may include a nock 8 connected to the elongated body 20 by a tether 16. The archery projectile locating facility 400 may include an antenna 12. The antenna 12 may comprise an elongated wire connected at one end to the elongated body 20. The antenna 12 may have a free end free of the elongated body 20. The elongated body 20 may include a signal designator 28. The signal designator 28 may be presented or communicated in a variety of ways. Examples include but are not limited to: a barcode, a Quick Reference (QR) code (as shown), an alpha-numeric code, a Radio-frequency Identification (RFID) tag, a Near-field Communication (NFC) device, combinations thereof, and/or the like. A distinct signal designator 28 may be included for each of a plurality of elongated bodies (e.g. 20) so that each of the plurality of elongated bodies (e.g. 20) may be distinguished from each other.

Figure 5:
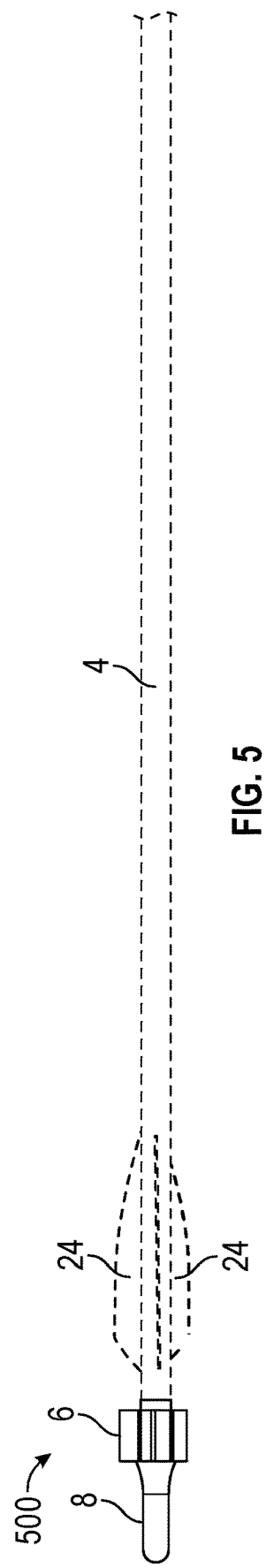
FIG. 5 illustrates an example archery projectile locating facility installed in an optional example hollow arrow shaft according to an aspect of an embodiment.

FIG. 5 illustrates an example archery projectile locating facility 500 installed in an optional example hollow arrow shaft 4 according to an aspect of an embodiment. The hollow arrow shaft 4 may comprise fletching 24. The archery projectile locating facility 500 may include a stop element 6. The stop element 6 may have a radial protrusion. The stop element 6 may include a cylindrical body. The stop element 6 may be adapted to be staked to a rear end of the hollow arrow shaft 4. The cylindrical body may define a bore adapted to receive a portion of a nock 8 removably connected to the hollow arrow shaft 4. The stop element 6 may comprise a plurality of radial protrusions. The plurality of radial protrusions may be adapted to substantially align with the fletching 24 when staked to a rear end of the hollow arrow shaft 4 as shown. The plurality of radial protrusions may have a lower profile than the fletching 24.

Figure 6:
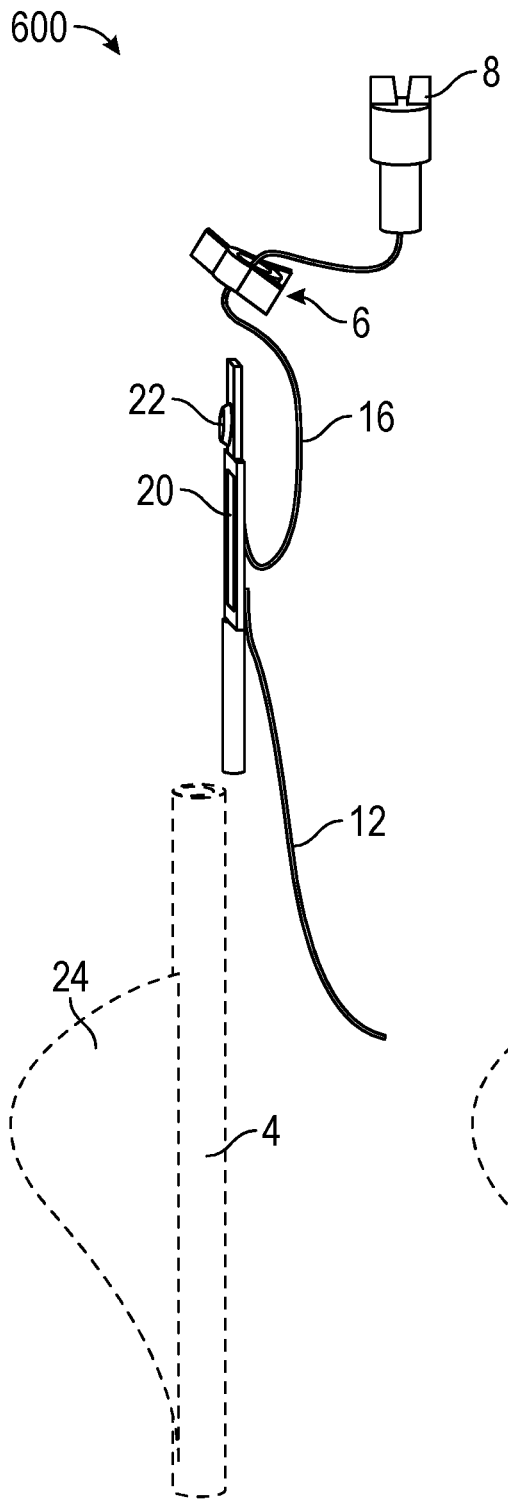
FIG. 6 illustrates an example archery projectile locating facility with an optional example hollow arrow shaft according to an aspect of an embodiment.

FIG. 6 illustrates an example archery projectile locating facility 600 with an optional example hollow arrow shaft 4 according to an aspect of an embodiment. The archery projectile locating facility 600 may comprise an elongated body 20. The elongated body 20 may be removably received in a rear aperture of the hollow arrow shaft 4. The elongated body 20 may include a connection facility adapted to connect to an archery projectile. The archery projectile may include the hollow arrow shaft 4. The connection facility may comprise at least one dimension of the elongated body 20. The connection facility may comprise a retention button 22. The retention button 22 may be compressible. The retention button 22 may comprise an O-ring. The retention button 22 may comprise a rubber gasket. The connection facility may be adapted to retain the elongated body 20 in the hollow arrow shaft 4. The connection facility may be adapted to retain the elongated body 20 in a plurality of hollow arrow shafts with a plurality of rear aperture interior diameters. The elongated body 20 may be slidably received in the hollow arrow shaft 4 such that the elongated body 20 is removable from the hollow arrow shaft 4 with limited force. The hollow arrow shaft 4 may comprise fletching 24. The archery projectile locating facility 600 may include a nock 8. The nock 8 may be connected to the elongated body 20 by a tether 16. The tether 16 may be connected at or near the middle of the elongated body 20. Connection of the tether 16 at or near the middle of the elongated body 20 may reduce the likelihood of premature removal of the elongated body 20 from a target game animal. The archery projectile locating facility 600 may include an antenna 12. The antenna 12 may comprise an elongated wire connected at one end to the elongated body 20. The antenna 12 may have a free end free of the elongated body 20. The archery projectile locating facility 600 may include a stop element 6. The stop element 6 may have a radial protrusion. The stop element 6 may be connected to the elongated body by the tether 16. Alternatively, the stop element 6 may comprise a bore adapted to fit over the antenna 12, the elongated body 20, and the tether 16, as shown.

Figure 7:
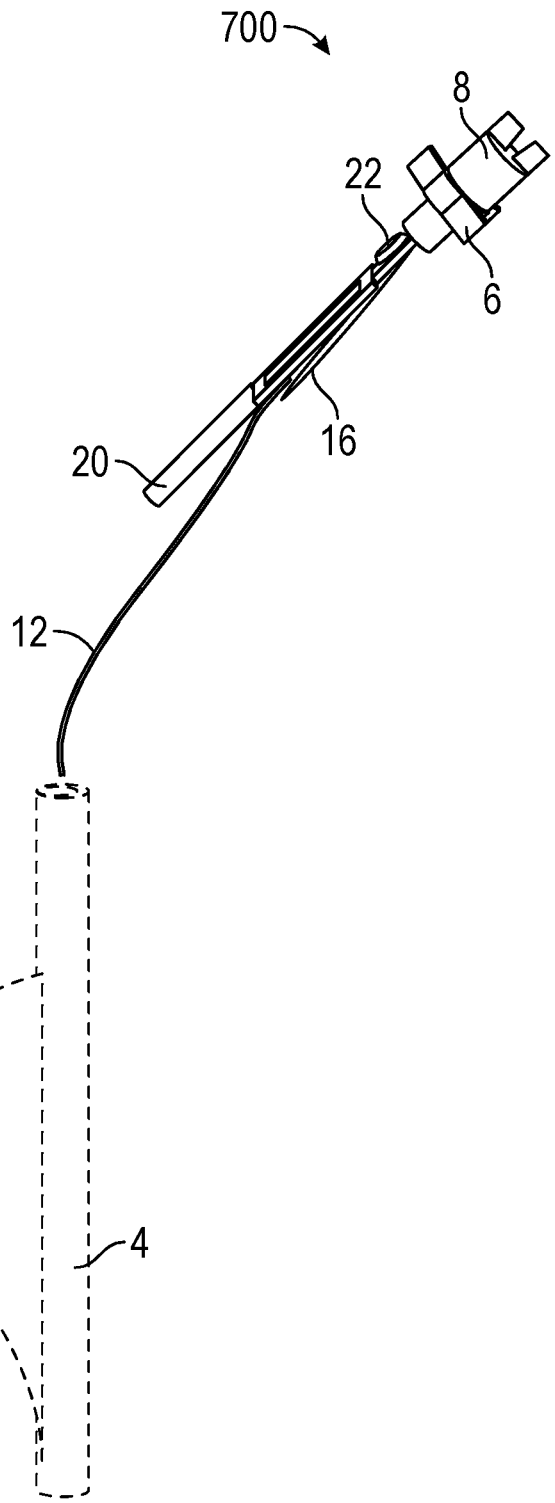
FIG. 7 illustrates an example archery projectile locating facility partially assembled for insertion into an optional example hollow arrow shaft according to an aspect of an embodiment.

FIG. 7 illustrates an example archery projectile locating facility 700 partially assembled for insertion into an optional example hollow arrow shaft 4 according to an aspect of an embodiment. The archery projectile locating facility 700 may comprise an elongated body 20. The elongated body 20 may be removably received in a rear aperture of the hollow arrow shaft 4. The elongated body 20 may include a connection facility adapted to connect to an archery projectile. The connection facility may comprise a retention button 22. The archery projectile may include the hollow arrow shaft 4. The hollow arrow shaft 4 may comprise fletching 24. The archery projectile locating facility 700 may include a nock 8 connected to the elongated body 20 by a tether 16. The archery projectile locating facility 700 may include a stop element 6. The stop element 6 may be connected to the nock 8 by way of a slip fit. The archery projectile locating facility 700 may include an antenna 12. The antenna 12 may comprise an elongated wire connected at one end to the elongated body 20. The antenna 12 may have a free end free of the elongated body 20.

Figure 8:
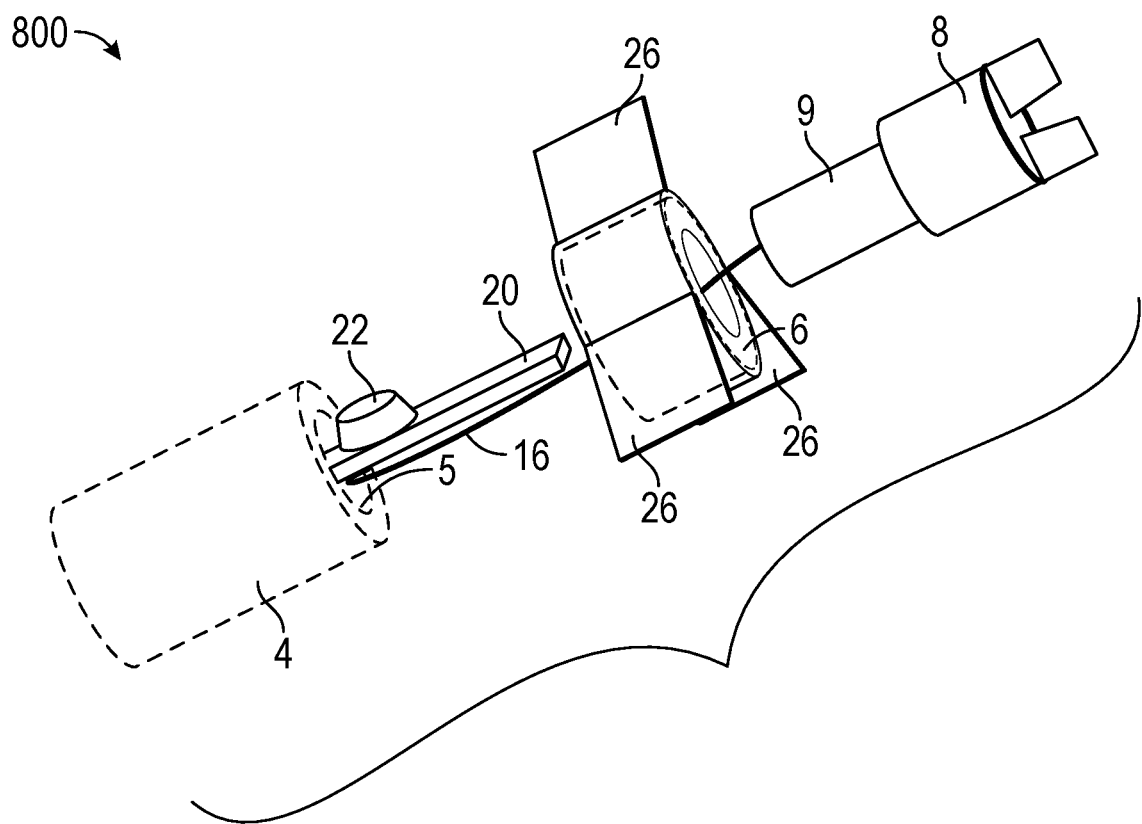
FIG. 8 illustrates an example archery projectile locating facility partially installed into an optional example hollow arrow shaft according to an aspect of an embodiment.

FIG. 8 illustrates an example archery projectile locating facility 800 partially installed into an optional example hollow arrow shaft 4 according to an aspect of an embodiment. The archery projectile locating facility 800 may comprise an elongated body 20. The elongated body 20 may be removably received in a rear aperture 5 of the hollow arrow shaft 4. The elongated body 20 may include a connection facility adapted to connect to an archery projectile. The connection facility may comprise a retention button 22. The archery projectile may include the hollow arrow shaft 4. The archery projectile locating facility 800 may include a nock 8 connected to the elongated body 20 by a tether 16. The nock 8 may comprise a shaft mating surface 9. The shaft mating surface 9 may be adapted to be removable received in the rear aperture 5 of the hollow arrow shaft 4. The shaft mating surface 9 may be connected to the hollow arrow shaft 4 by way of a slip fit. The archery projectile locating facility 700 may include a stop element 6. The stop element 6 may define a bore adapted to receive the shaft mating surface 9. The stop element 6 may be adapted to connect to the shaft mating surface 9 of the nock 8 by way of a slip fit. The stop element 6 may comprise a radial protrusion 26. The radial protrusion 26 may comprise a planar fin element having a plane parallel to an axis defined by the elongated body 20.

Figure 9:
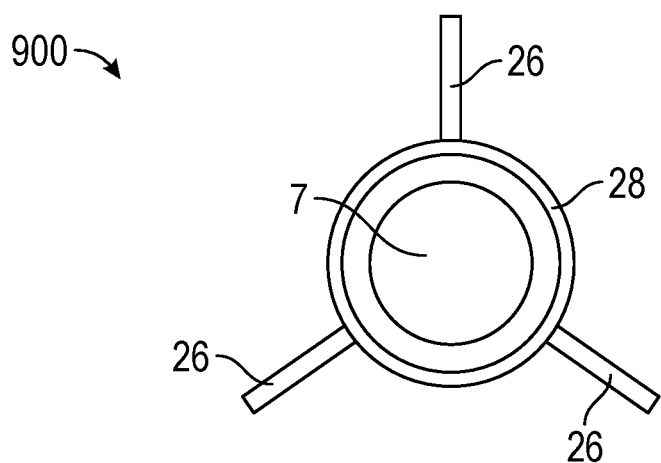
FIG. 9 illustrates an example stop element according to an aspect of an embodiment.

FIG. 9 illustrates an example stop element 900 according to an aspect of an embodiment. The stop element 900 may include a cylindrical body 28. The cylindrical body 28 may define a bore 7 adapted to receive a portion of a nock. The stop element 900 may comprise a plurality of radial protrusions 26.

FIG. 10 illustrates an example archery projectile with an example archery projectile locating facility travelling through a cavity 40 of a target animal according to an aspect of an embodiment. The archery projectile may include a hollow arrow shaft 4. The hollow arrow shaft 4 may have a shaft radius. The archery projectile locating facility may comprise an elongated body 20. The archery projectile locating facility may include a nock 8. The nock 8 may be connected to the elongated body 20 by a tether 16. The archery projectile locating facility may include a stop element 6. The stop element 6 may have a radial protrusion. The radial protrusion may extend to a greater radius than the shaft radius, such that the radial protrusion is adapted to contact target animal tissue (e.g. entrance side skin 41 of cavity 40) and prevent complete penetration of the stop element 6 and the nock 8 into the cavity 40 even if the archery projectile penetrates beyond the target animal (e.g. exit side skin 43 of cavity 40).

FIG. 11 illustrates an example archery projectile penetrating beyond a cavity 40 of a target animal, and an example archery projectile locating facility separated from the archery projectile according to an aspect of an embodiment. The archery projectile may include a hollow arrow shaft 4. The hollow arrow shaft 4 may have a shaft radius. The archery projectile locating facility may comprise an elongated body 20. The archery projectile locating facility may include an antenna 12. The antenna 12 may comprise an elongated wire connected at one end to the elongated body 20. The archery projectile locating facility may include a nock 8. The nock 8 may be connected to the elongated body 20 by a tether 16. The archery projectile locating facility may include a stop element 6. The stop element 6 may have a radial protrusion. The radial protrusion may extend to a greater radius than the shaft radius, such that the radial protrusion is adapted to contact target animal tissue (e.g. entrance side skin 41 of cavity 40) to prevent the elongated body 20 from penetrating beyond a target animal (e.g. exit side skin 43 of cavity 40) even as the archery projectile may penetrate beyond the target animal (e.g. exit side skin 43 of cavity 40).

FIG. 12 illustrates an example archery projectile locating facility embedded in a cavity 40 of a target animal according to an aspect of an embodiment. The archery projectile locating facility may have been separated from an archery projectile as the archery projectile travelled into target animal tissue (e.g. entrance side skin 41 of cavity 40), through the cavity 40, and beyond the target animal (e.g. exit side skin 43 of cavity 40). The archery projectile locating facility may comprise an elongated body 20. The archery projectile locating facility may include an antenna 12. The antenna 12 may comprise an elongated wire connected at one end to the elongated body 20. The archery projectile locating facility may include a nock 8. The nock 8 may be connected to the elongated body 20 by a tether 16. The tether 16 may be connected at or near the middle of the elongated body 20. Connection of the tether 16 at or near the middle of the elongated body 20 may reduce the likelihood of premature removal of the elongated body 20 from the cavity 40. The archery projectile locating facility may include a stop element 6. The stop element 6 may have a radial protrusion.

Figure 13:
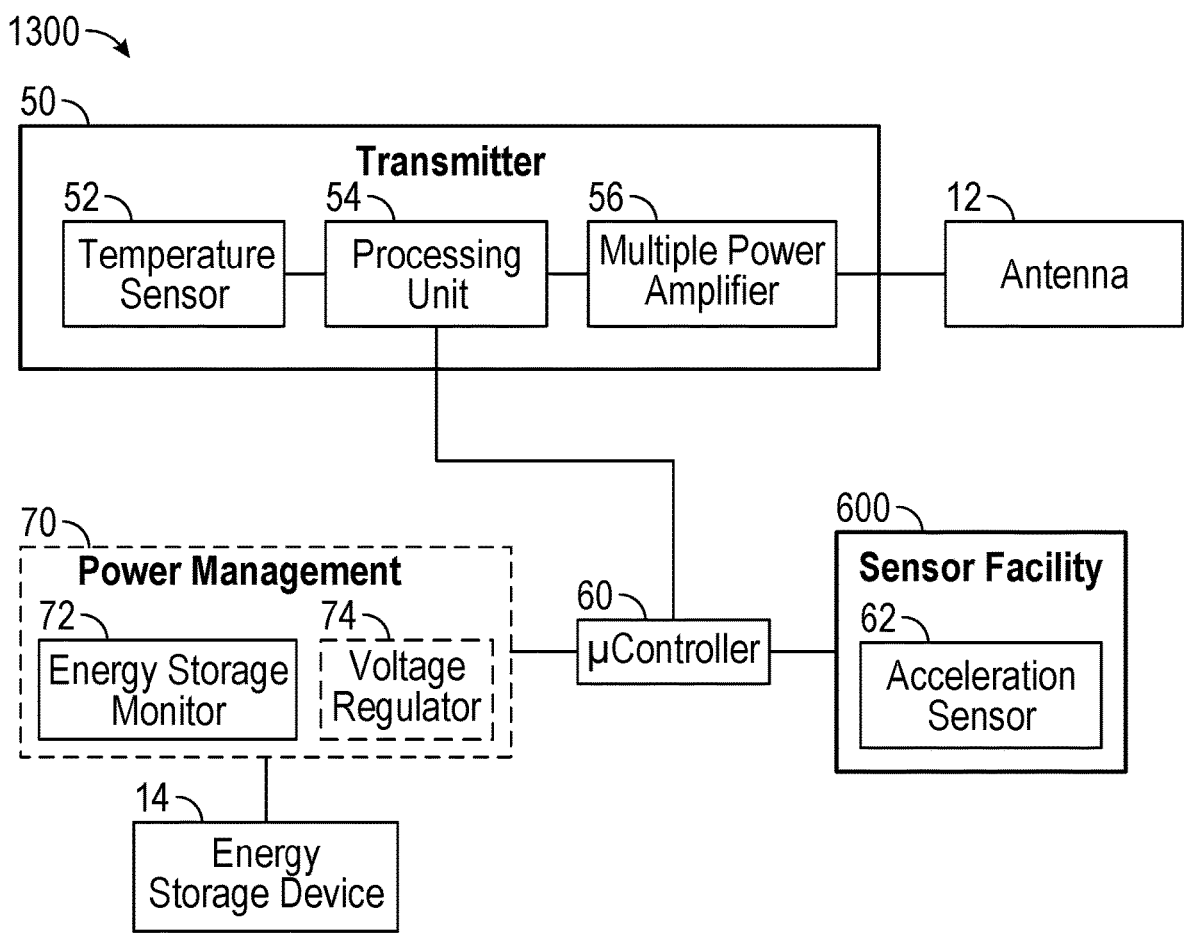
FIG. 13 is a block diagram showing an example archery projectile locating facility as per an aspect of an embodiment.

FIG. 13 is a block diagram showing an example archery projectile locating facility 1300 as per an aspect of an embodiment. The archery projectile locating facility 1300 may comprise a transmitter 50. The transmitter 50 may comprise a temperature sensor 52. The transmitter 50 may comprise a processing unit 54. The transmitter 50 may comprise a multiple power digital amplifier 56. The archery projectile locating facility 1300 may comprise an antenna 12 in electrical communication with the transmitter 50. The antenna 12 may be in electrical communication with the multiple power digital amplifier 56. The archery projectile locating facility 1300 may comprise a microcontroller 60. The transmitter 50 may be in communication with the microcontroller 60. The archery projectile locating facility 1300 may comprise a sensor facility 600 in communication with the microcontroller 60. The sensor facility 600 may comprise the microcontroller 60. The sensor facility 600 may comprise an acceleration sensor 62. The acceleration sensor 62 may be adapted to generate acceleration information. The sensor facility 600 may be operable to detect a flight state. The microcontroller 60 may be operable to detect a flight state based on the acceleration information. The microcontroller 60 may be operable to detect an impact. The microcontroller 60 may be operable to detect an impact based on the acceleration information. The microcontroller 60 may be operable to generate movement information after an impact has been detected. The movement information may comprise a binary representation of movement based on the acceleration information. The archery projectile locating facility 1300 may comprise an energy storage device 14. The energy storage device 14 may be in electrical communication with a power management facility 70. The power management facility 70 may comprise an energy storage monitor 72. The power management facility 70 may comprise a voltage regulator 74. The energy storage device 14 may be in electrical communication with the microcontroller 60. The energy storage device 14 may be in electrical communication with the microcontroller 60 through the power management facility 70. The sensor facility 600 may comprise the energy storage monitor 72. The energy storage monitor 72 may be adapted to generate energy status information. The sensor facility 600 may comprise the temperature sensor 52. The temperature sensor 52 may be adapted to generate temperature information. The transmitter 50 may be operable to broadcast at least one data signal after the flight state has been detected. The at least one data signal may include information generated by the sensor facility 600. The transmitter 50 may be adapted to transmit the acceleration information as part of the at least one data signal. The acceleration information may comprise binary data on movement information. The movement information may be based on the acceleration information. The acceleration information may comprise acceleration data on three axes generated by the acceleration sensor 62. The transmitter 50 may be adapted to transmit the energy status information as part of the at least one data signal. The transmitter 50 may be adapted to transmit the temperature information as part of the at least one data signal.

According to an embodiment, an energy storage device (e.g. 14) may be adapted to power a transmitter (e.g. 50) for a range to 12 to 96 consecutive hours.

According to an embodiment, a transmitter (e.g. 50) may be adapted to transmit at one or more of a plurality of frequencies. The plurality of frequencies may be part of one or more frequency bands. The plurality of frequencies and/or the one or more frequency bands may be specific to a particular jurisdiction and/or region of intended use. Each frequency in the plurality of frequencies may be based on a signal identifier. For example, in an example jurisdiction, the plurality of frequencies may comprise 434 MHz and 868 MHz. A directional receiver (e.g. 30) may be adapted to receive data frames transmitted at one or more of the plurality of frequencies. The one or more of the plurality of frequencies may be based on providing a range of up to 1 to 3 miles between the transmitter (e.g. 50) and the directional receiver (e.g. 30).

According to an embodiment, at least one data signal may be encrypted. Encryption may be based on a signal designator (e.g. 28). A directional receiver (e.g. 30) may be adapted to decrypt the at least one data signal through employment of the signal designator (e.g. 28). The directional receiver (e.g. 30) may be required to receive or capture the signal designator (e.g. 28) from an elongated body (e.g. 20) prior to decrypting the at least one data signal.

According to an embodiment, a first of at least one data signal may be transmitted at a first power level. A second of the at least one data signal may be transmitted at a second power level. The first power level is distinct from the second power level. The first power level and the second power level may correspond to the transmit power of a multiple power digital amplifier (e.g. 56).

According to an embodiment, each of a plurality of data signals may be encoded with a signal code. The signal code may be based on a transmit power level of a multiple power digital amplifier (e.g. 56). A directional receiver (e.g. 30) may be adapted to decode the plurality of data signals. The directional receiver (e.g. 30) may be programmed with a plurality of signal codes. The directional receiver (e.g. 30) may be adapted to select one of the plurality of data signals to decode based on a received power level. For example, when a high power level for a first of the plurality of data signals is received, the directional receiver (e.g. 30) may be adapted to select another data signal. For example, when a low power level for a second of the plurality of data signals is received, the directional receiver (e.g. 30) may be adapted to select the second data signal. The directional receiver (e.g. 30) may be adapted to select the data signal received at the lowest power of all data signals received at a received power high enough to maintain signal integrity (i.e. minimal or no loss of signal and/or signal data).

Figure 14:
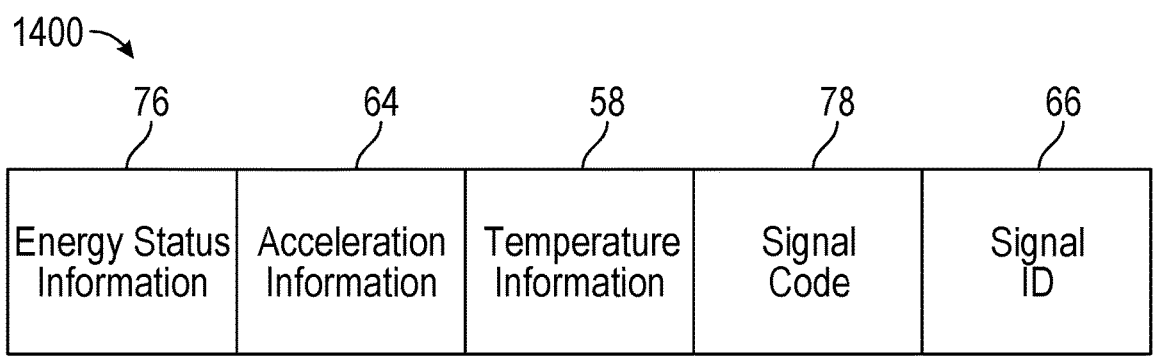
FIG. 14 is a block diagram showing an example data frame of an archery projectile locating facility as per an aspect of an embodiment.

FIG. 14 is a block diagram showing an example data frame 1400 of an archery projectile locating facility as per an aspect of an embodiment. The data frame 1400 may be transmitted by a transmitter (e.g. 50) of an elongated body (e.g. 20). The data frame 1400 may comprise an energy status information field 76. The energy status information field 76 may comprise energy status information. The data frame 1400 may comprise an acceleration information field 64. The acceleration information field 64 may comprise acceleration information. The acceleration information field 64 may comprise movement information. The data frame 1400 may comprise a temperature information field 58. The temperature information field 58 may comprise temperature information. The data frame 1400 may comprise a signal code field 78. The signal code field 78 may comprise a signal code. The signal code may be based on a power level employed by a multiple power digital amplifier (e.g. 56) to transmit the data frame 1400. The data frame 1400 may comprise a signal ID field 66. The signal ID 66 field may comprise a signal designator. The signal designator may be unique to the specific elongated body (e.g. 20) adapted to transmit data frames comprising the signal designator.

Figure 15:
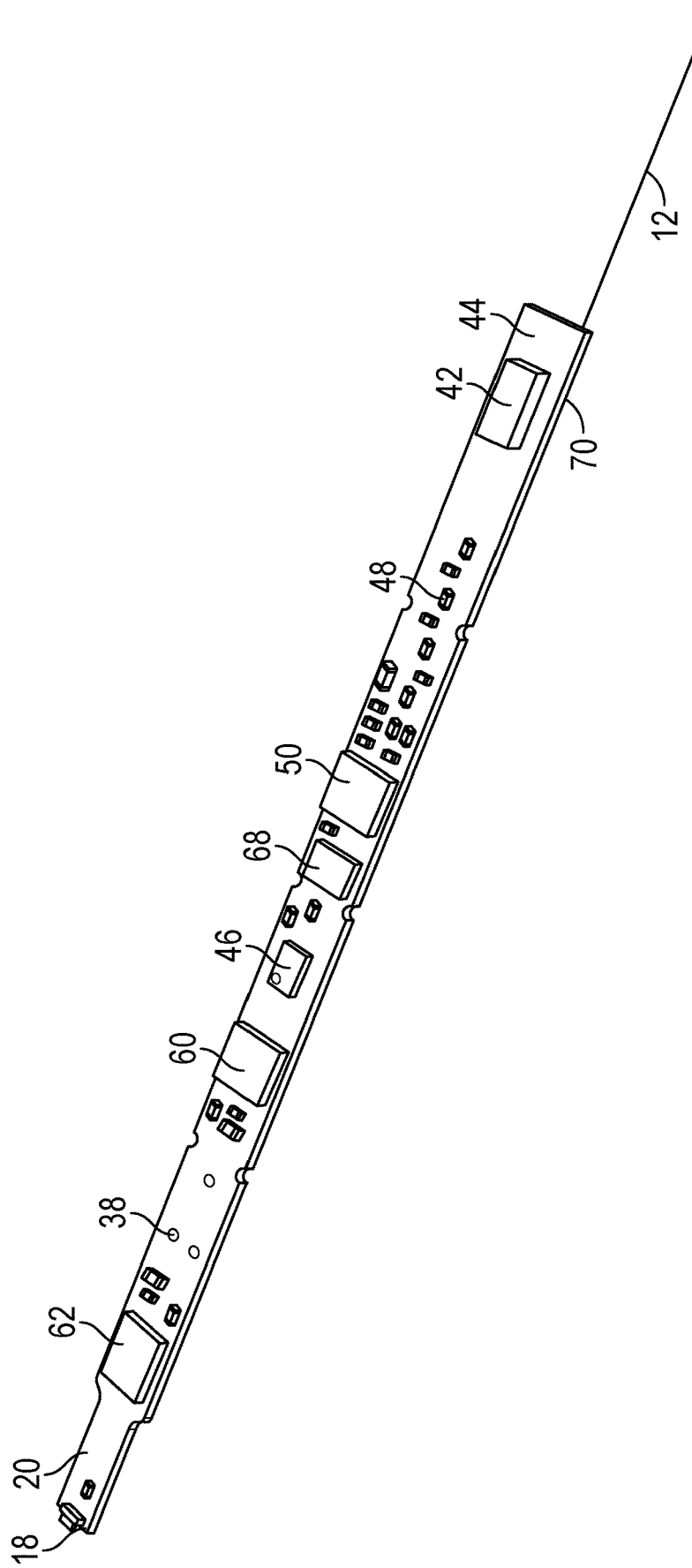
FIG. 15 schematically illustrates an example elongated body of an example archery projectile locating facility as per an aspect of an embodiment.

FIG. 15 schematically illustrates an example elongated body 20 of an example archery projectile locating facility as per an aspect of an embodiment. The elongated body 20 may comprise an LED 18. The elongated body 20 may comprise a sensor facility. The elongated body 20 may comprise an acceleration sensor 62. The sensor facility may comprise the acceleration sensor 62. The acceleration sensor 62 may be adapted to generate acceleration information on the elongated body 20. The elongated body 20 may comprise a charge and/or debug connector 38. The elongated body 20 may comprise a microcontroller 60. The elongated body 20 may comprise a computer readable medium 46. The computer readable medium 46 may comprise instructions. The elongated body 20 may comprise an oscillator 68. The elongated body 20 may comprise a transmitter 50. The transmitter 50 may comprise a temperature sensor (e.g. 52). The sensor facility may comprise the temperature sensor (e.g. 52). The temperature sensor (e.g. 52) may be adapted to generate temperature information on the elongated body 20. The transmitter 50 may comprise a processing unit (e.g. 54). The transmitter 50 may comprise a multiple power digital amplifier (e.g. 56). The elongated body 20 may comprise an antenna filter 48. The antenna filter may be in electrical communication with an antenna 12. The elongated body 20 may comprise a power switch 42. The elongated body 20 may comprise energy storage terminals 44. The elongated body 20 may comprise a power management facility 70. The power management facility 70 may comprise an energy storage monitor (e.g. 72). The sensor facility may comprise the energy storage monitor (e.g. 72). The energy storage monitor (e.g. 72) may be adapted to generate energy status information. The energy status information may comprise an indication of power remaining in an energy storage device (e.g. 14). The power management facility 70 may comprise a voltage regulator (e.g. 74). The computer readable medium 46 may be adapted to store information generated by the acceleration sensor 62, the temperature sensor (e.g. 52), the energy storage monitor (e.g. 72), the microcontroller 60, combinations thereof, and/or the like.

Figure 16:
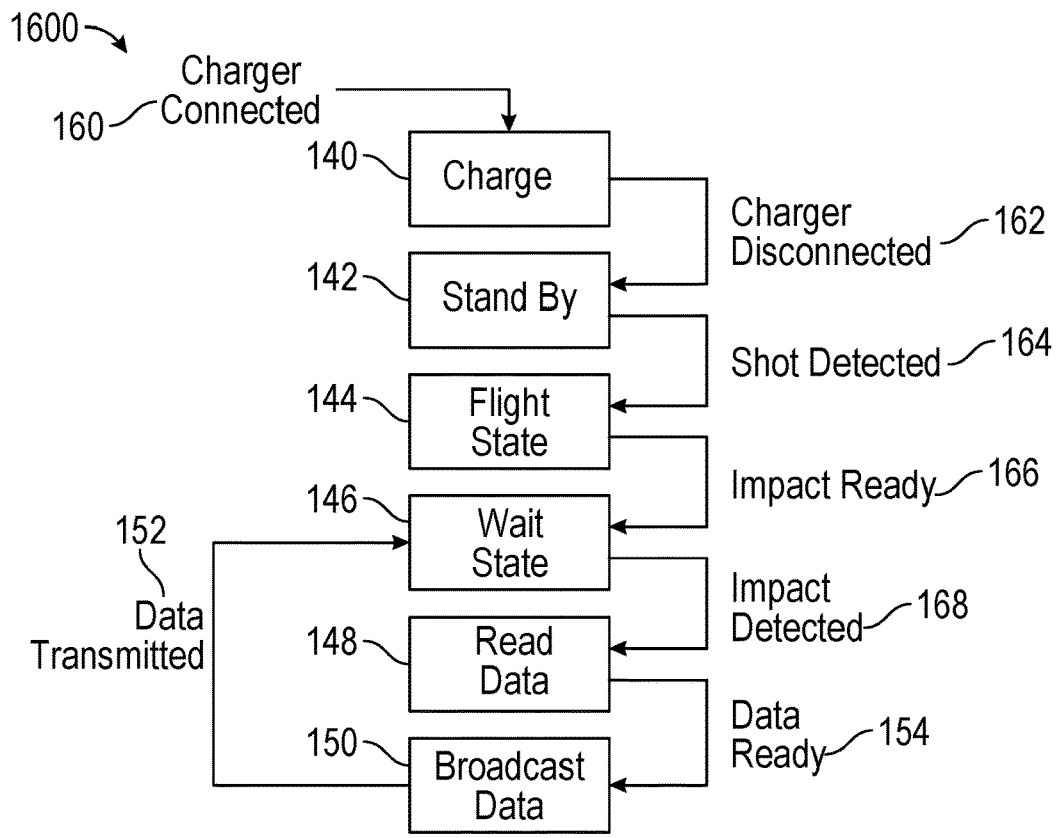
FIG. 16 is a state diagram for an example elongated body of an example archery projectile locating facility as per an aspect of an embodiment.

FIG. 16 is a state diagram for an example elongated body 1600 of an example archery projectile locating facility as per an aspect of an embodiment. The elongated body 1600 may be operable to standby at 142. Upon a charger being connected at 160, the elongated body 1600 may be operable to charge at 140. Upon a charger being disconnected at 162, the elongated body 1600 may be operable to standby at 142. Upon a shot being detected at 164, the elongated body 1600 may enter into a flight state at 144. After a flight state at 144, the elongated body 1600 may be operable to enter into impact ready at 166. After impact ready at 166, the elongated body 1600 may be operable to enter into a wait state at 146. Upon an impact being detected at 168, the elongated body 1600 may be operable to read data at 148. After data is read at 148, the elongated body 1600 may be operable to enter data ready at 154. Once data is ready at 154, the elongated body 1600 may be operable to broadcast data at 150. Once data has been transmitted at 152, the elongated body 1600 may be operable to return to the wait state at 146.

Figure 17:
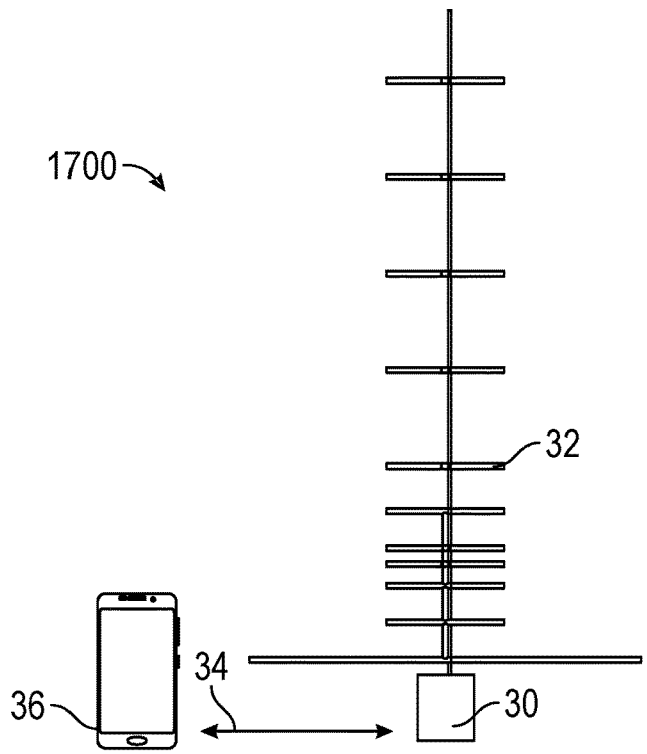
FIG. 17 illustrates an example direction receiver of an example archery projectile locating facility as per an aspect of an embodiment.

FIG. 17 illustrates an example direction receiver system 1700 of an example archery projectile locating facility as per an aspect of an embodiment. The direction receiver system 1700 may comprise a directional receiver 30. The directional receiver 30 may be in electrical communication with a directional antenna 32. The directional antenna 32 may be collapsible. The directional antenna 32 may comprise an assembly of a plurality of directional antenna sections. The directional receiver 30 may be adapted to receive at least one data signal. The directional receiver 30 may be employed by a user to locate an elongated body (e.g. 20). The directional receiver 30 may be adapted to communicate with a remote computing device 36. The directional receiver 30 and the remote computing device 36 may be adapted to communicate via wireless network 34. Examples of the wireless network 34 include but are not limited to: Wi-Fi, WiMAX, LTE, Bluetooth, Bluetooth LE, combinations thereof, and/or the like.

Figure 18:
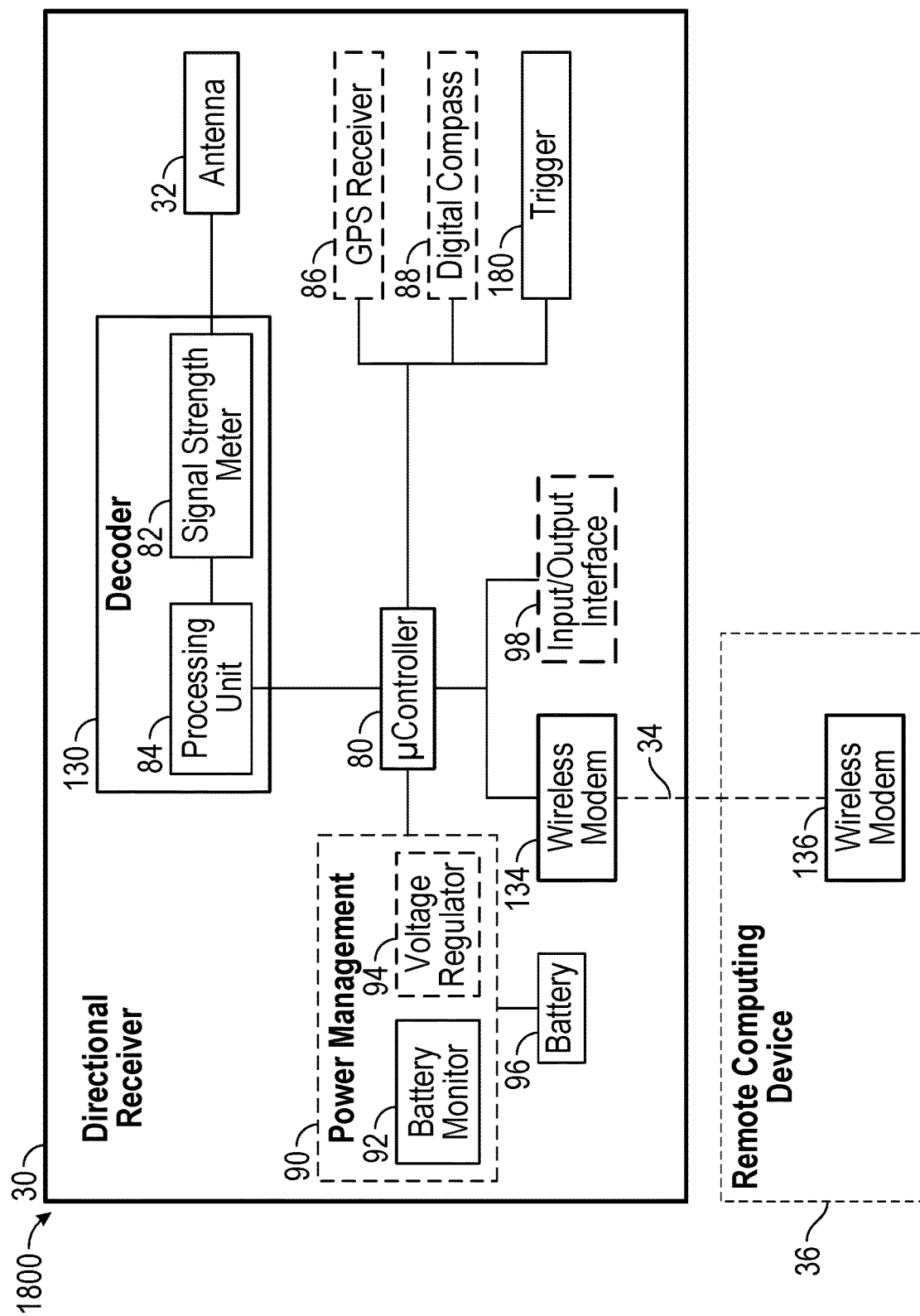
FIG. 18 is a block diagram showing an example directional receiver system of an archery projectile locating facility as per various aspects of an embodiment.

FIG. 18 is a block diagram showing an example directional receiver system 1800 of an archery projectile locating facility as per various aspects of an embodiment. The direction receiver system 1800 may comprise a directional receiver 30. The directional receiver 30 may comprise a decoder 130. The decoder 130 may comprise a processing unit 84. The decoder 130 may comprise a signal strength meter 82. The decoder 130 may be in electrical communication with a directional antenna 32. The directional receiver 30 may comprise a battery 96. The directional receiver 30 may comprise a power management facility 90. The power management facility 90 may comprise a battery monitor 92. The power management facility 90 may comprise a voltage regulator 94. The power management facility 90 may be in electrical communication with the battery 96. The directional receiver 30 may comprise a microcontroller 80. The microcontroller 80 may be in communication with the decoder 130. The microcontroller 80 may be in electrical communication with the battery 96. The microcontroller 80 may be in electrical communication with the power management facility 90. The directional receiver 30 may comprise a wireless modem 134. The wireless modem 134 may be adapted to communicate with one or more remote devices (e.g. 36) over wireless network 34. The wireless modem 134 may be in communication with the microcontroller 80. The directional receiver 30 may comprise an input/output interface 98. The input/output interface 98 may be in electrical communication with the microcontroller 80. The directional receiver 30 may comprise a GPS receiver 86. The GPS receiver 86 may be in communication with the microcontroller 80. The GPS receiver 86 may be adapted to communicate location information of the directional receiver 30. The directional receiver 30 may comprise a digital compass 88. The digital compass 88 may be in communication with the microcontroller 80. The digital compass 88 may be employed to estimate an azimuth of the directional antenna 32. Direction information may be communicated to the remote computing device 36. The direction information may comprise the azimuth of the directional antenna 32. The direction information may comprise an estimated direction to a transmitter (e.g. 50) of at least one data signal. The estimated direction may be based on the azimuth of the directional antenna 32 and/or the received signal strength of the at least one data signal. The directional receiver 30 may comprise a trigger 180. The trigger 180 may be in communication with the microcontroller 80. The trigger 180 may be employed to activate one or more components of the directional receiver 30. The direction receiver system 1800 may comprise a remote computing device 36. The directional receiver 30 may be adapted to communicate with the remote computing device 36. The directional receiver 30 may be adapted to communicate the location information to the remote computing device 36. The remote computing device 36 may comprise a wireless modem 136. The wireless modem 136 may be adapted to communicate with the directional receiver 30 over wireless network 34.

Figure 19:
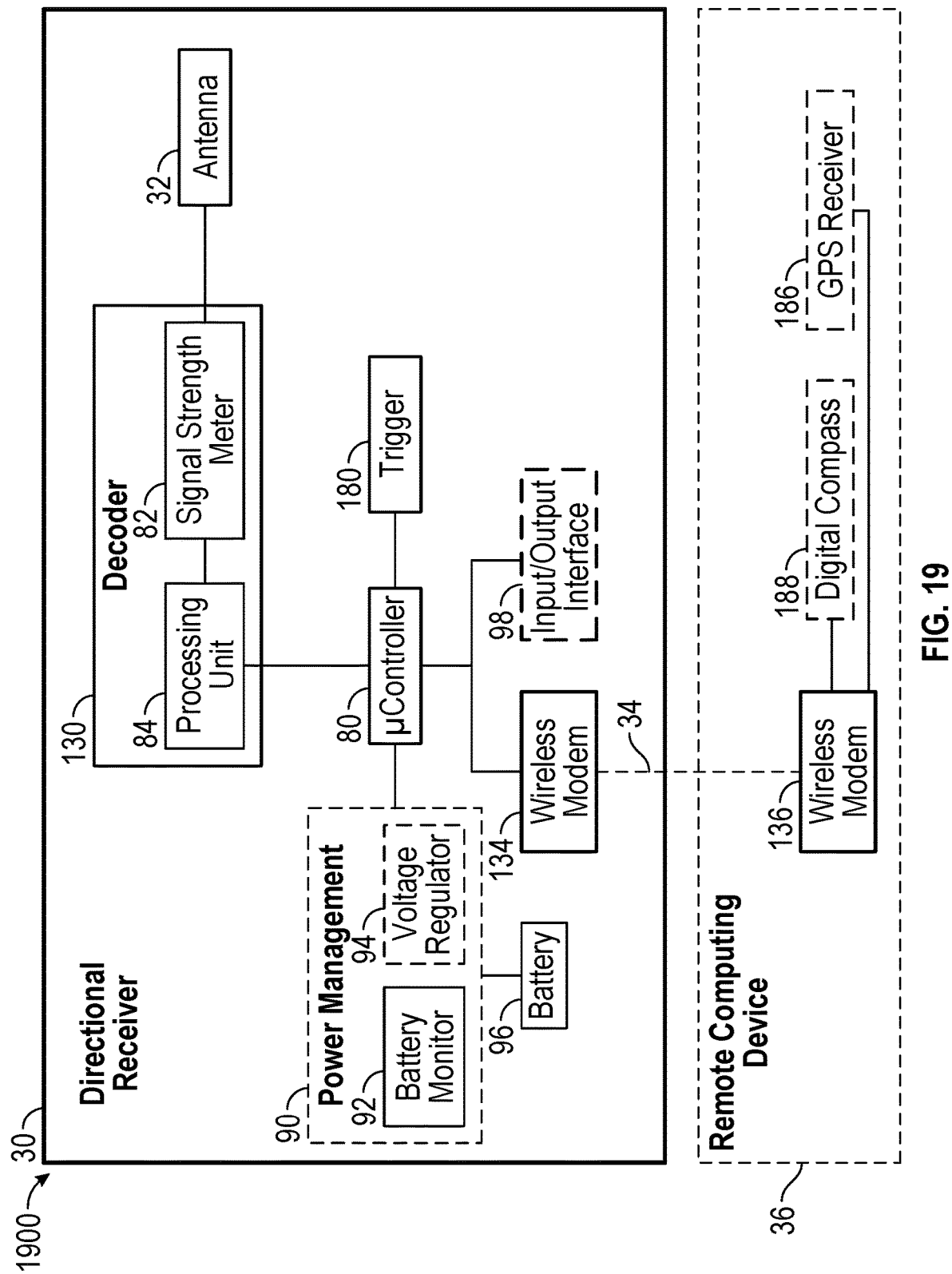
FIG. 19 is a block diagram showing an example directional receiver system of an archery projectile locating facility as per various aspects of an embodiment.

FIG. 19 is a block diagram showing an example directional receiver system 1900 of an archery projectile locating facility as per various aspects of an embodiment. The direction receiver system 1900 may comprise a directional receiver 30. The directional receiver 30 may comprise a decoder 130. The decoder 130 may comprise a processing unit 84. The decoder 130 may comprise a signal strength meter 82. The decoder 130 may be in electrical communication with a directional antenna 32. The directional receiver 30 may comprise a battery 96. The directional receiver 30 may comprise a power management facility 90. The power management facility 90 may comprise a battery monitor 92. The power management facility 90 may comprise a voltage regulator 94. The power management facility 90 may be in electrical communication with the battery 96. The directional receiver 30 may comprise a microcontroller 80. The microcontroller 80 may be in communication with the decoder 130. The microcontroller 80 may be in electrical communication with the battery 96. The microcontroller 80 may be in electrical communication with the power management facility 90. The directional receiver 30 may comprise a wireless modem 134. The wireless modem 134 may be adapted to communicate with one or more remote devices (e.g. 36) over wireless network 34. The wireless modem 134 may be in communication with the microcontroller 80. The directional receiver 30 may comprise an input/output interface 98. The input/output interface 98 may be in electrical communication with the microcontroller 80. The directional receiver 30 may comprise a trigger 180. The trigger 180 may be in communication with the microcontroller 80. The trigger 180 may be employed to activate one or more components of the directional receiver 30. The direction receiver system 1900 may comprise a remote computing device 36. The directional receiver 30 may be adapted to communicate with the remote computing device 36. The remote computing device 36 may comprise a wireless modem 136. The wireless modem 136 may be adapted to communicate with the directional receiver 30 over wireless network 34. The remote computing device 36 may comprise a GPS receiver 186. The GPS receiver 186 may be in communication with the wireless modem 136. The remote computing device 36 may comprise a digital compass 188. The digital compass 188 may be in communication with the wireless modem 136.

Figure 20:
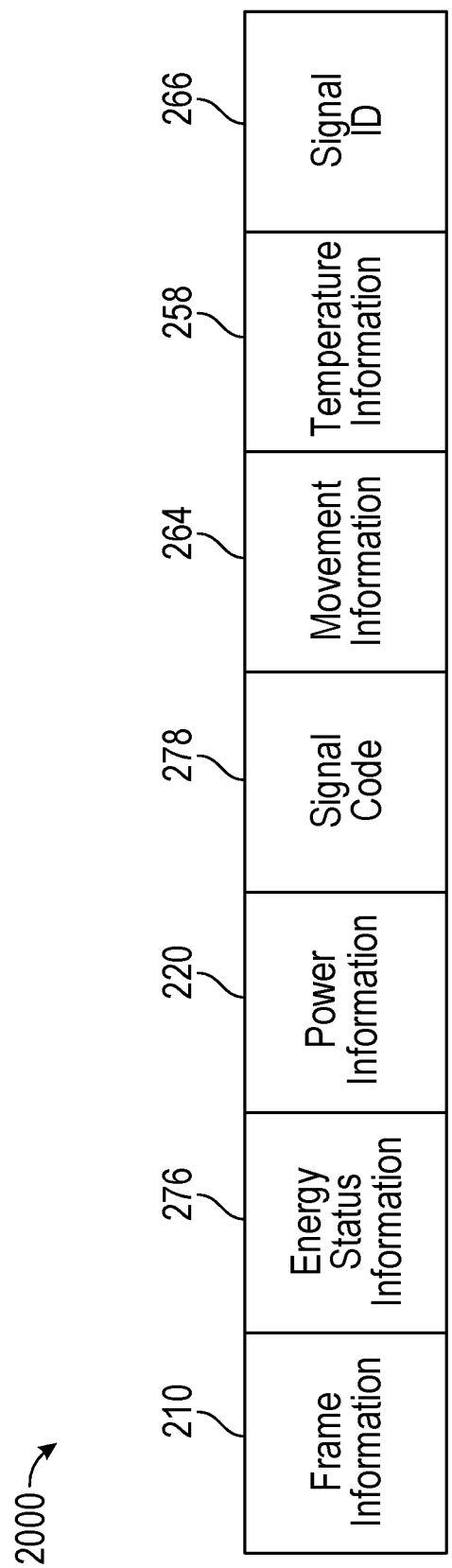
FIG. 20 is a block diagram showing an example data frame of a directional receiver as per an aspect of an embodiment.

FIG. 20 is a block diagram showing an example data frame 2000 of a directional receiver as per an aspect of an embodiment. The directional receiver (e.g. 30) may be adapted to communicate information to one or more remote computing devices (e.g. 36). The data frame 2000 may be transmitted by a wireless modem (e.g. 134) of a directional receiver (e.g. 30) to the one or more remote computing devices (e.g. 36). The data frame 2000 may comprise a frame information field 210. The frame information field 210 may comprise frame information. The frame information may comprise an indication of frame integrity based on a data frame (e.g. 1400) received from an elongated body (e.g. 20). For example, the frame information may be configured to indicate a loss of data frames and/or part of a data frame. For example, the frame information may be configured to indicate a corrupted data frame. The data frame 2000 may comprise an energy status information field 276. The energy status information field 276 may comprise energy status information. The energy status information may be received in the data frame (e.g. 1400) transmitted from the elongated body (e.g. 20). The data frame 2000 may comprise a power information field 220. The power information field 220 may comprise power information. The power information may comprise an indication of a power level of the data frame (e.g. 1400) received from the elongated body (e.g. 20). The power level may be measured by a signal strength meter (e.g. 82) of the directional receiver (e.g. 30). The power level may be based on a distance to the elongated body (e.g. 20). The power level may be based on an angle between the elongated body (e.g. 20) and a directional antenna (e.g. 32). The data frame 2000 may comprise a signal code field 278. The signal code field 278 may comprise a signal code. The signal code may be received in the data frame (e.g. 1400) transmitted from the elongated body (e.g. 20). The signal code may be based on a power level employed by a multiple power digital amplifier (e.g. 56) of the elongated body (e.g. 20) to transmit the data frame (e.g. 1400). The data frame 2000 may comprise a movement information field 264. The movement information field 264 may comprise movement information. The movement information may comprise acceleration information. The acceleration information may be received in the data frame (e.g. 1400) transmitted from the elongated body (e.g. 20). The movement information may comprise a binary representation of movement of the elongated body (e.g. 20) based the acceleration information. The binary representation of movement may comprise two states: zero movement based on zero acceleration, and some movement based on some acceleration. The data frame 2000 may comprise a temperature information field 258. The temperature information field 258 may comprise temperature information. The temperature information may be received in the data frame (e.g. 1400) transmitted from the elongated body (e.g. 20). The data frame 2000 may comprise a signal ID field 266. The signal ID field 266 may comprise a signal designator. The signal designator may be required to decrypt an encrypted data frame (e.g. 1400) transmitted from the elongated body (e.g. 20).

According to an embodiment, a directional receiver (e.g. 30) may be adapted to communicate information to one or more remote computing devices (e.g. 36). The information may be communicated through employment of at least one data frame (e.g. 2000). For example, a first data frame may comprise the following data:
001  BL063  PW045  IX1  M0  TA+28.0  ID0093006A400F44554E45

The first field (001) may represent frame information (e.g. 210). "001" may, for example, indicate good frame integrity. The second field (BL063) may represent energy status information (e.g. 276). "BL063" may, for example, indicate 63 percent remaining battery life. The third field (PW045) may represent power information (e.g. 220). "PW045" may, for example, indicate a power level measured by the directional receiver (e.g. 30). The fourth field (IX1) may represent a signal code. "IX1" may, for example, indicate a first signal code. The fifth field (M0) may represent movement information. "M0" may, for example, indicate zero movement at an elongated body (e.g. 20). The sixth field (TA+28.0) may represent temperature information. "TA+28.0" may, for example, indicate a temperature of 28 degrees Celsius at the elongated body (e.g. 20). The seventh field (ID0093006A400F44554E45) may represent a signal ID. "ID0093006A400F44554E45" may, for example, indicate a signal designator. For example, a second data frame may comprise the following data:
001  BL063  PW026  IX2  M0  TA+28.0  ID0093006A400F44554E45

In this example, only the third field (PW026) and the fourth field (IX2) differ from the first data frame. In the second data frame, "PW026" may, for example, indicate a lower power level than the "PW045" from the first data frame. In the second data frame, "IX2" may, for example, indicate a second signal code. Therefore, the data from the first data frame and the data from the second data frame may indicate that the first signal code was transmitted at a higher power level from the elongated body (e.g. 20) than the second signal code. Although these examples illustrate two data frames from two distinct signal codes, persons of ordinary skill in the art will recognize that additional data frames including additional distinct signal codes may be transmitted at distinct power levels by an elongated body (e.g. 20) and received by a directional receiver (e.g. 30). For example, four data frames may be transmitted in succession by the elongated body (e.g. 20), each of the four data frames including a distinct signal code and transmitted at a distinct power level. A first data frame may, for example, be transmitted at a maximum power. A second data frame may, for example, be transmitted at 50 percent of the maximum power. A third data frame may, for example, be transmitted at 25 percent of the maximum power. A forth data frame may, for example, be transmitted at 5 percent of the maximum power.

According to an embodiment, a directional receiver (e.g. 30) may be adapted to select data frames including one of a plurality of signal codes. Selection may be based on power information. For example, the directional receiver (e.g. 30) may be adapted to select data frames corresponding to the signal code received at the lowest power level as measured by the directional receiver (e.g. 30) as long as good frame integrity is maintained.

Figure 21:
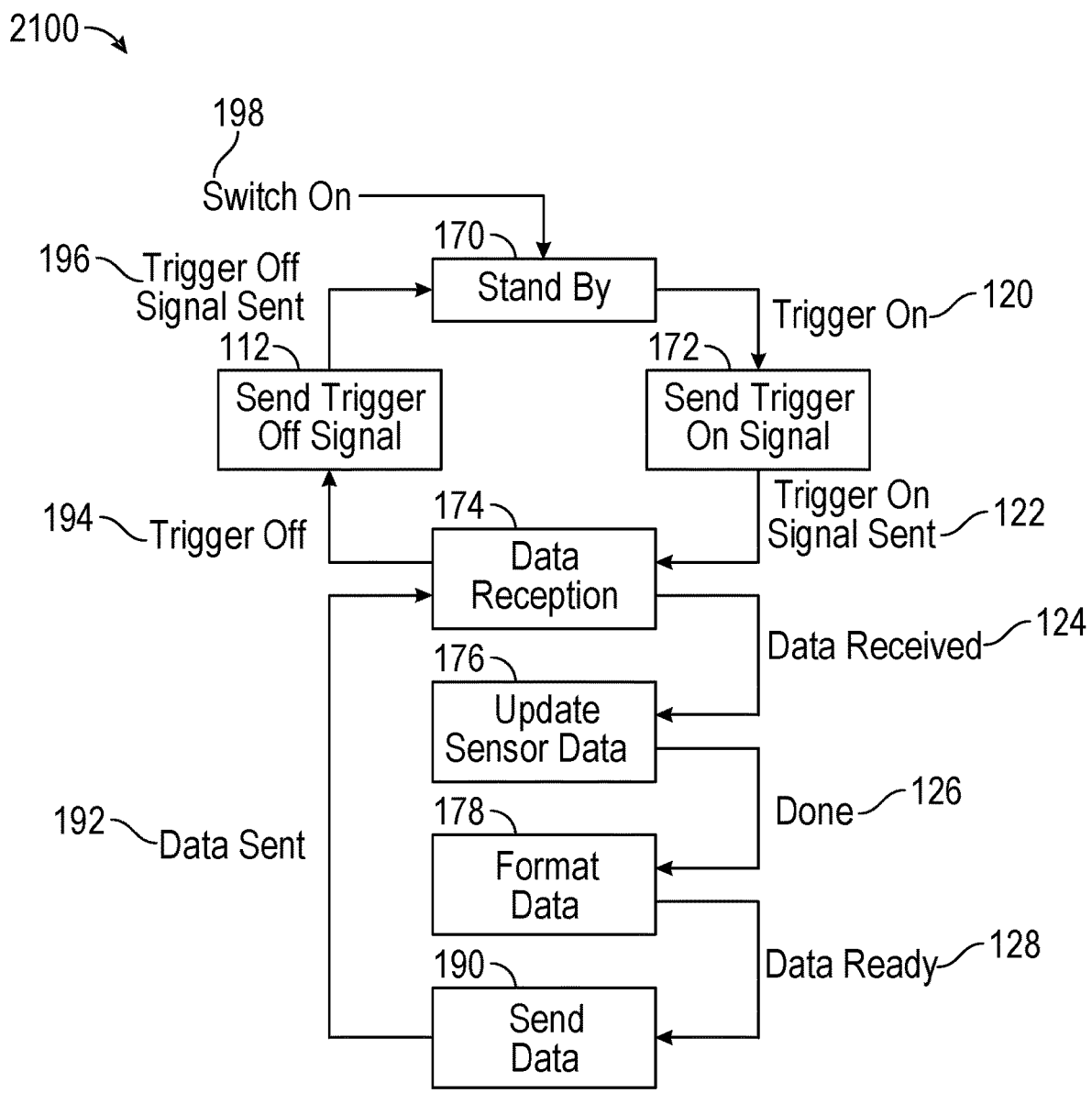
FIG. 21 is a state diagram for an example directional receiver of an example archery projectile locating facility as per an aspect of an embodiment.

FIG. 21 is a state diagram for an example directional receiver 2100 of an example archery projectile locating facility as per an aspect of an embodiment. Upon power up or a switch on event at 198, the directional receiver 2100 may be operable to standby at 170. Upon a trigger on event at 120, the directional receiver 2100 may be operable to send a trigger on signal at 172. Upon a trigger on signal sent at 122, the directional receiver 2100 may be operable to receive data at 174. Upon data received at 124, the directional receiver 2100 may be operable to update sensor data at 176. Upon completion of sensor update at 126, the directional receiver 2100 may be operable to format data at 178. Once the data is ready at 128, the directional receiver 2100 may be operable to send data at 190. After the data has been sent at 192, the directional receiver 2100 may be operable to return to data reception state at 174. Upon a trigger off event at 194, the directional receiver 2100 may be operable to send a trigger off signal at 112. Upon a trigger off signal sent at 196, the directional receiver 2100 may be operable to standby at 170.

Various embodiments have been presented. Each of these embodiments may of course include features from other embodiments presented, and embodiments not specifically described may include various features described herein.

A person of ordinary skill in the art will appreciate that components shown in and described with respect to the figures are provided by way of example only. Numerous other configurations are possible. Accordingly, embodiments of the present disclosure should not be construed as being limited to any particular configuration. It will be appreciated that while the disclosure may in certain instances describe a single example embodiment, there may be other configurations, shapes, and orientations of facilities and components without departing from example embodiments of the present disclosure. A person of ordinary skill in the art will recognize the applicability of embodiments of the present disclosure to various archery arrow shafts, bolts, broadheads, tips, bows, crossbows, and combinations thereof known in the art. A person of ordinary skill in the art may recognize that embodiments of the present disclosure may comprise fabricated, milled, printed, extruded, molded, combinations thereof, and/or the like parts comprising one material or a plurality of materials. A person of ordinary skill in the art will appreciate that components and elements shown in and described with respect to FIGS. 1-21 are provided by way of example only. Numerous other archery projectiles, bows, crossbows, antennas, microchips, and various archery and electrical component configurations are possible. Accordingly, embodiments of the present disclosure should not be construed as being limited to any particular archery projectile, bow, crossbow, or archery component. Additionally, it is to be recognized that, while the present disclosure has been described above in terms of various embodiments, it is not limited thereto. Various features, aspects, and/or components of the above described present disclosure may be used individually or jointly. Accordingly, the claims set forth below should be construed in view of the full breadth of the embodiments as disclosed herein.

In this specification, "a" and "an" and similar phrases are to be interpreted as "at least one" and "one or more." References to "a", "an", and "one" are not to be interpreted as "only one". References to "an" embodiment in this disclosure are not necessarily to the same embodiment.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a facility described as having three optional features may be embodied in seven different ways, namely with just one of the three possible features, with any two of the three possible features or with all three of the three possible features.

Further, the purpose of the Abstract of the Disclosure is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

We claim:

1. An archery projectile locating facility comprising:
   an elongated body;
   the elongated body including a connection facility adapted to connect to the archery projectile;
   the elongated body including a microcontroller;
   the elongated body including a sensor facility in communication with the microcontroller and operable to detect a flight state;
   the elongated body including a transmitter in communication with the microcontroller and having a multiple power digital amplifier and operable to broadcast a plurality of data signals after the flight state has been detected, the plurality of data signals including information generated by the sensor facility; and
   wherein the transmitter is operable to transmit a first of the plurality of data signals at a first power level and to transmit a second of the plurality of data signals at a second power level, the first power level distinct from the second power level.

2. The locating facility according to claim 1, including a directional receiver adapted to receive the at least one data signal, such that the elongated body may be located by a user with the directional receiver.

3. The locating facility according to claim 2, wherein the directional receiver is further adapted to communicate at least one of the following to a remote computing device:
   location information;
   direction information;
   temperature information;
   energy status information; and
   movement information.

4. The locating facility according to claim 2, wherein the directional receiver is further adapted to decode the at least one data signal.

5. The locating facility according to claim 1, wherein the elongated body is removably received in a rear aperture of a hollow arrow shaft.

6. The locating facility according to claim 5, including a stop element connected to the elongated body and having a radial protrusion.

7. The locating facility according to claim 6, wherein the stop element includes a cylindrical body adapted to be staked to a rear end of a hollow arrow shaft, and defines a bore adapted to receive a portion of a nock removably connected to the hollow arrow shaft.

8. The locating facility according to claim 6, wherein the hollow arrow shaft has a shaft radius and the radial protrusion extends to a greater radius than the shaft radius, such that the radial protrusion is adapted to contact target animal tissue to prevent the elongated body from penetrating beyond a target animal even as the hollow arrow shaft may penetrate beyond.

9. The locating facility according to claim 8, wherein the hollow arrow shaft has fletching, and the stop element has a plurality of radial protrusions adapted to substantially align with the fletching when staked to a rear end of the hollow arrow shaft.

10. The locating facility according to claim 8, wherein the radial protrusion is a planar fin element having a plane parallel to an axis defined by the elongated body.

11. The locating facility according to claim 6, wherein the stop element is connected to the elongated body by a tether.

12. The locating facility according to claim 6, including a nock connected to the elongated body by a tether.

13. The locating facility according to claim 6, wherein the stop element is connected to the hollow arrow shaft by way of a slip fit.

14. The locating facility according to claim 1, wherein the elongated body includes a signal designator.

15. The locating facility according to claim 14, wherein the at least one data signal is encrypted based on the signal designator.

16. The locating facility according to claim 15, wherein the directional receiver is further adapted to decrypt the at least one data signal through employment of the signal designator.

17. The locating facility according to claim 5, wherein the elongated body is slidably received in the hollow arrow shaft such that the elongated body is removable from the hollow arrow shaft with limited force.

18. The locating facility according to claim 1, including an antenna in electrical communication with the transmitter.

19. The locating facility according to claim 18, wherein the antenna is an elongated wire connected at one end to the elongated body.

20. The locating facility according to claim 19, wherein the antenna has a free end free of the elongated body.

21. The locating facility according to claim 1, the sensor facility including a temperature sensor adapted to generate temperature information on the elongated body.

22. The locating facility according to claim 21, wherein the transmitter is adapted to transmit the temperature information as part of the at least one data signal.

23. The locating facility according to claim 1, including an energy storage device in electrical communication with the microcontroller and the sensor facility, and wherein the sensor facility is operable to generate energy status information.

24. The locating facility according to claim 23, wherein the transmitter is adapted to transmit the energy status information as part of the at least one data signal.

25. The locating facility according to claim 1, the sensor facility including an acceleration sensor adapted to generate movement information.

26. The locating facility according to claim 25, wherein the transmitter is adapted to transmit the movement information as part of the at least one data signal.

27. The locating facility according to claim 1, wherein each of the at least one data signal is encoded based on a transmit power level.

28. The locating facility according to claim 1, wherein the first of the at least one data signal is encoded with a first signal code, and the second of the at least one data signal is encoded with a second signal code, the first signal code distinct from the second signal code.

29. The locating facility according to claim 1, including operating a receiver to select the data signal received at the lower power level of the first power level and the second power level that has adequate signal integrity.

30. The locating facility according to claim 1, wherein all the data signals are transmitted non-directionally.

* * * * *